(No Model.) 3 Sheets—Sheet 1.
A. G. WATERHOUSE.
AUTOMATIC RHEOSTAT AND CONTACT POINT.
No. 375,403. Patented Dec. 27, 1887.
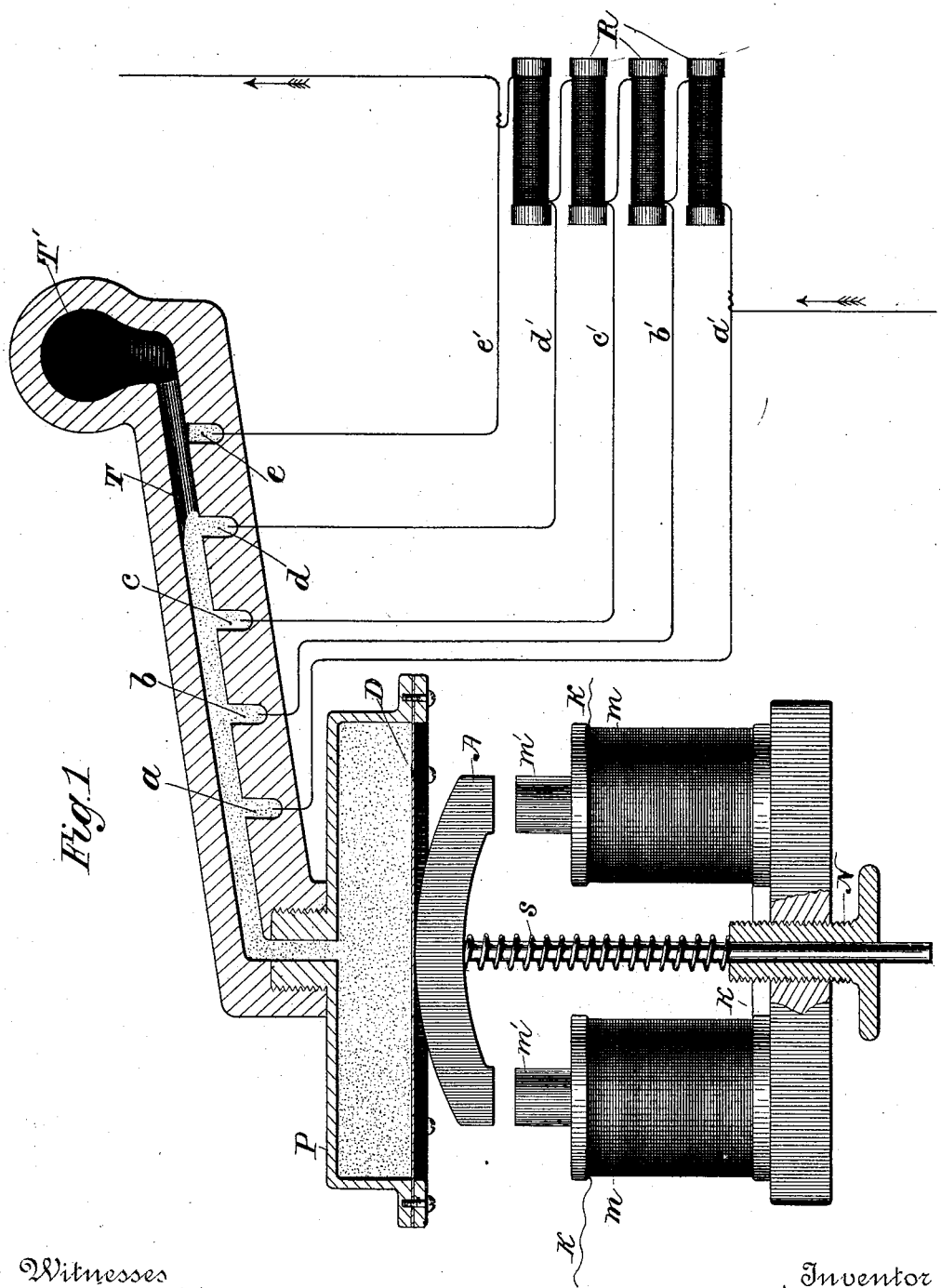
Witnesses
Frank H. Pierpont
S W Bishop
Inventor
Addison G. Waterhouse

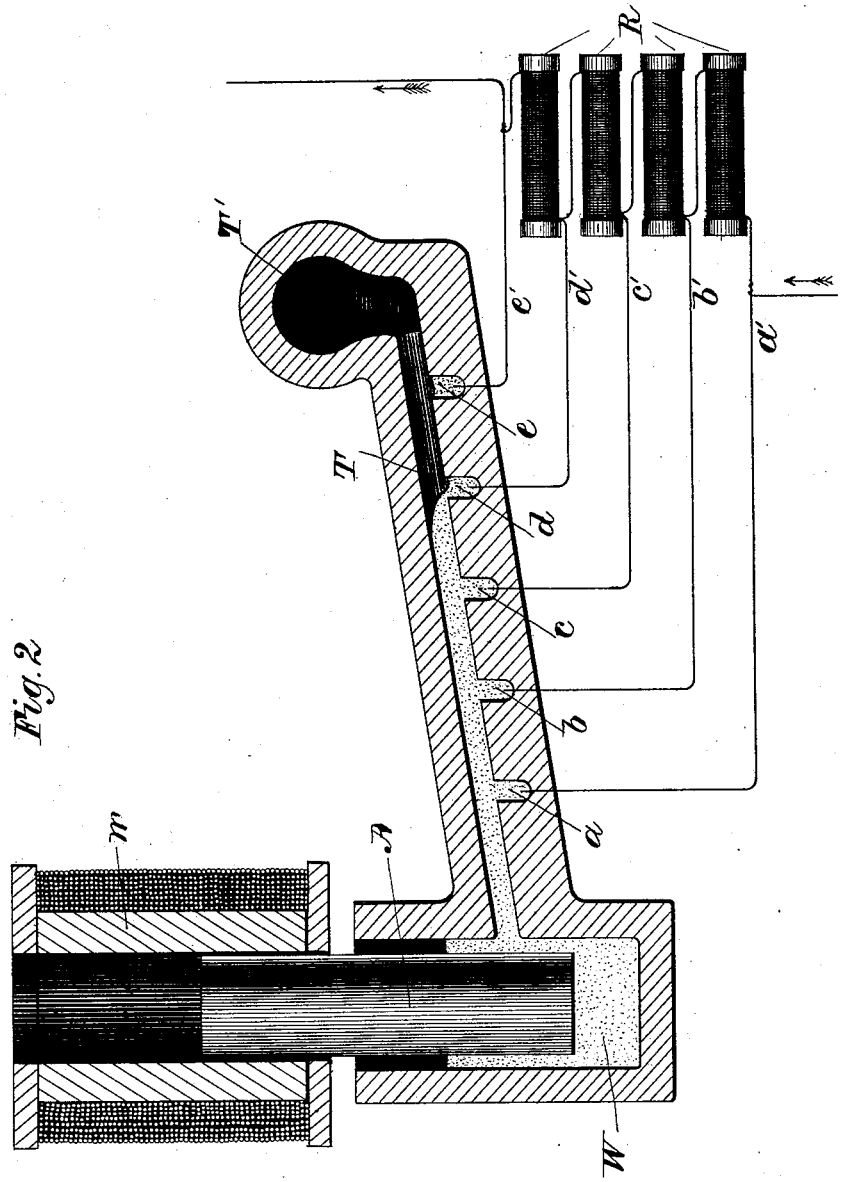

(No Model.) 3 Sheets—Sheet 3.
A. G. WATERHOUSE.
AUTOMATIC RHEOSTAT AND CONTACT POINT.
No. 375,403. Patented Dec. 27, 1887.
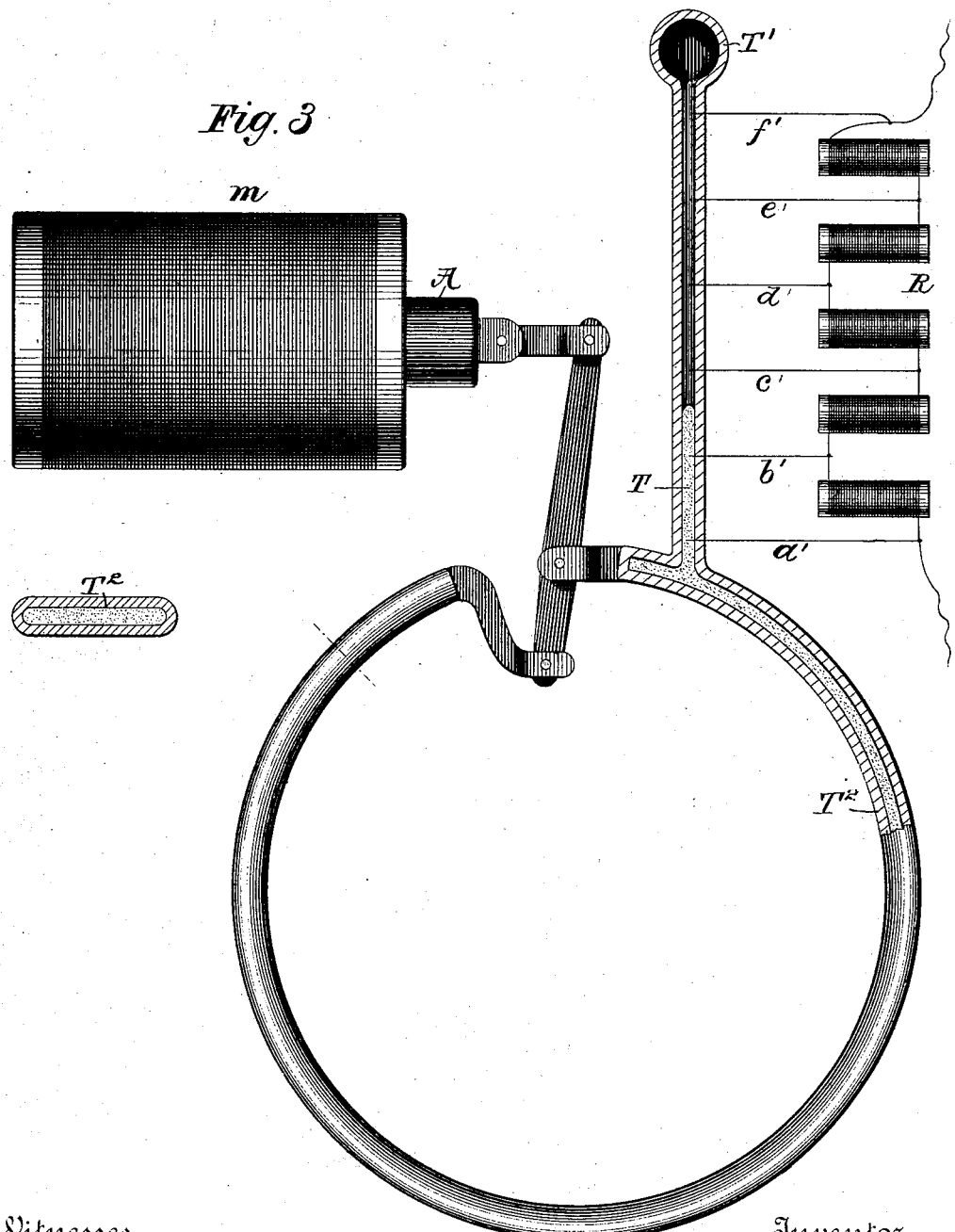
Witnesses
Frank H. Pierpont
John F. Cook
Inventor
Addison G. Waterhouse

UNITED STATES PATENT OFFICE.

ADDISON G. WATERHOUSE, OF HARTFORD, CONNECTICUT, ASSIGNOR TO THE WATERHOUSE ELECTRIC AND MANUFACTURING COMPANY, OF SAME PLACE.

AUTOMATIC RHEOSTAT AND CONTACT-POINT.

SPECIFICATION forming part of Letters Patent No. 375,403, dated December 27, 1887.

Application filed January 29, 1887. Serial No. 225,939. (No model.)

*To all whom it may concern:*

Be it known that I, ADDISON G. WATERHOUSE, of the city of Hartford, in the State of Connecticut, have invented a new and useful Improvement in Automatic Rheostats and Contact-Points, of which the following is a specification, reference being had to the accompanying drawings and letters marked thereon.

My invention first relates to the use of certain mechanical means of producing a rise and fall of a column or well of mercury or conducting fluid, and, second, in a series of cells containing such mercury or fluid, the contents of each cell forming contact with electrical conductors and each cell being placed at different altitudes and arranged so that as a column of mercury or fluid rises or falls it will form an electrical contact with more or less of such cells.

In the accompanying drawings, Figure 1 represents both parts of my invention; and Figs. 2 and 3 are modifications thereof, hereinafter described.

P represents the chamber of a diaphragm pressure-gage filled with mercury D in the diaphragm.

A is an armature pressed up against the diaphragm by the spring $s$ and adjusted by screw N, so as to press the diaphragm which bulges it in and presses the mercury up the inclined tube T, we will say, to cell $e$, as shown. $m$ is an electro-magnet with poles $m'$, that draw the armature back against the spring and allow the weight of the mercury to bulge the diaphragm out and cause the column of mercury in P to recede to cell $a$, the electro-magnet $m$ being energized by a current in conductor K, so that any change in the current produces corresponding changes in the altitude of the mercury in tube T. Now, tube T is made on an incline so that a small raise in the mercury will travel a longer distance in the tube, and so that the cells $a$, $b$, $c$, $d$, and $e$ will be nearer perpendicular positions and can remain filled with mercury after the column recedes from them. The cells $a$, $b$, $c$, $d$, and $e$ are each provided with conductors $a'$, $b'$, $c'$, $d'$, and $e'$, which electrically connect to the mercury in their cells and which intersect a series of resistances, R, so that as the mercury in the tube rises, it mingles with the mercury in the cells and short-circuits more or less cells, and consequently more or less of the resistance R, one advantage of this form being that the mercury can be hermetically sealed and kept free from atmospheric corrosions to allow the mercury to rise in the tube T. I provide an air-chamber, T, that will allow the mercury to compress the air as it rises in the tube T.

Fig. 2 is another form, consisting of the tube T, with cells $a$, $b$, $c$, $d$, and $e$, with conductors $a'$, $b'$, $c'$, $d'$, and $e'$, leading to resistance R, and the chamber T', which may be an open riser-tube. The weight of the armature A raises the mercury, as described, and as the electro-magnet $m$ draws the armature A up from the well W the mercury falls in it and in the tube T, as described in Fig. 1. It will be seen that the advantage of this way of making and breaking electrical contact is that I separate the fluid or mercury itself, which, by circulation, removes itself at any point where a spark is created. Instead of a tube, T, a wide passage can be formed for the mercury to rise in, and long slots crossing the passage can be formed instead of the cells $a$, $b$, $c$, $d$, and $e$, so that by their width great carrying capacity can be secured.

In place of the pressure-gage shown, any form can be used, such as a Bordan spring or that class of gages where an external pressure can produce a displacement to an inclosed fluid.

Such an embodiment of my invention is illustrated in Fig. 3, wherein $T^2$ represents a Bordan spring, and T the inclosed tube leading therefrom and into which the mercury is forced to contact with the points $a'$, $b'$, $c'$, and $c$ by drawing the ends of said spring together by means of suitable connections with the armature A of the electro-magnet $m$. In this instance the inclosed tube T is arranged vertically and the conductors are led therein, as shown, the cells for holding a small quantity of conducting-fluid, heretofore described, being omitted.

What I claim as my invention is—

1. An inclosed tube or passage, T, provided with two or more cells, a, b, c, d, and e, with conductors leading therefrom and means for causing said fluid to rise more or less in said tube, whereby to place one or more of said cells in electrical connection, substantially as described.

2. A closed pressure-gage composed of a chamber, P, and diaphragm D, or its equivalent, filled with mercury or conducting fluid and provided with a tube or chamber having electrical contact-points and means for exerting pressure on said gage to elevate the mercury in said tube or chamber, to cause said mercury or fluid to electrically connect said contact-points, substantially as described.

3. A rheostat consisting of the combination of a compressible tube or chamber provided with a quantity of mercury or other conducting fluid, resistances connected with said tube to be placed in or out of electrical connection by the rise or fall of said fluid, an armature connected with the tube to cause the variations in the height of the fluid, and an electromagnet for moving the armature, substantially as described.

4. The combination of an inclined tube connecting with a chamber containing a conducting-fluid, cells in said tube, and provided with conductors leading therefrom, a magnet, and an armature moved thereby and adapted to exert pressure upon said fluid in the tube to cause the fluid to rise or fall to form electrical connection with one or more of said conductors, substantially as described.

ADDISON G. WATERHOUSE.

Witnesses:
CHARLES E. CHAPIN,
JAS. A. STONE.